United States Patent [19]
Osaka et al.

[11] Patent Number: 5,558,001
[45] Date of Patent: Sep. 24, 1996

[54] PNEUMATIC BOOSTER

[75] Inventors: Nobumaro Osaka; Yasuhiko Amari; Takanobu Enomoto, all of Yamanashi-ken, Japan

[73] Assignee: Tokico Ltd., Kanagawa-ken, Japan

[21] Appl. No.: 260,985

[22] Filed: Jun. 15, 1994

[30] Foreign Application Priority Data

Jun. 17, 1993 [JP] Japan .................................. 5-171192

[51] Int. Cl.$^6$ ........................................................ F15B 9/10
[52] U.S. Cl. ...................................................... 91/376 R
[58] Field of Search .............................. 91/369.1, 369.2, 91/369.3, 376 R; 92/96, 98 R

[56] References Cited

U.S. PATENT DOCUMENTS

| | | | |
|---|---|---|---|
| 4,825,750 | 5/1989 | Rudiger et al. | 91/369.1 X |
| 5,263,399 | 11/1993 | Flory et al. | 91/376 R |

FOREIGN PATENT DOCUMENTS

| | | | |
|---|---|---|---|
| 3836609 | 5/1990 | Germany . | |
| 0097550 | 6/1983 | Japan | 91/376 R |
| 0128869 | 6/1987 | Japan | 91/369.1 |
| 2231377 | 11/1990 | United Kingdom . | |
| 94/02339 | 2/1994 | WIPO . | |
| 94/04403 | 3/1994 | WIPO . | |

*Primary Examiner*—Edward K. Look
*Assistant Examiner*—Hoang Nguyen
*Attorney, Agent, or Firm*—Wenderoth, Lind & Ponack

[57] ABSTRACT

A pneumatic booster has a valve member arranged to operate stably even under a large differential pressure. The inside of a housing is divided into a constant-pressure chamber and a variable-pressure chamber by a diaphragm. A plunger and a valve member are disposed in a valve body supported by the diaphragm such that the plunger and the valve member are slidable relative to each other. The valve member is formed from a rigid reinforcing member and an elastic member bonded to the reinforcing member. The plunger is movable in association with an input shaft. The movement of the plunger is transmitted to the valve member through a valve spring, causing the valve member to separate from a seat portion provided on the plunger. Thus, compressed air is introduced into the variable-pressure chamber from a pneumatic device through passages to produce a differential pressure between the variable-pressure chamber and the constant-pressure chamber, which is supplied with a negative pressure from an engine, thereby driving the valve body.

6 Claims, 4 Drawing Sheets

PNEUMATIC BOOSTER

BACKGROUND OF THE INVENTION

The present invention relates to a pneumatic booster used in a brake system of a vehicle or the like.

A known pneumatic booster is provided with a constant-pressure chamber where a negative pressure constantly acts, and a variable-pressure chamber whose pressure can be controlled by a switching operation of a valve. When force is applied to an input shaft connected to a brake pedal, the valve is actuated, so that the atmospheric pressure acts on the variable-pressure chamber. Consequently, force is applied to a diaphragm that divides the constant-pressure chamber and the variable-pressure chamber, and the force is transmitted to an output shaft. When the force applied to the input shaft is removed, the valve allows the constant-pressure chamber and the variable-pressure chamber to communicate with each other. Thus, the force applied to the output shaft is canceled.

In the conventional pneumatic booster, the switching valve has a readily deformable portion and hence suffers from the disadvantage that when the pressure difference between the constant-pressure chamber and the variable-pressure chamber is large, air leakage occurs, and thus the desired operation cannot satisfactorily be performed. This problem is particularly remarkable in a pneumatic booster of the type in which pressurized air is supplied to the variable-pressure chamber.

SUMMARY OF THE INVENTION

In view of the above-described circumstances, it is an object of the present invention to provide a pneumatic booster which is designed so that a switching valve is capable of stably operating even under a large differential pressure.

To this end, the present invention provides a pneumatic booster including a housing defining a space therein, and a diaphragm dividing the inside of the housing into a constant-pressure chamber and a variable-pressure chamber. A valve body is hermetically attached to the diaphragm. The valve body has a first passage providing communication between the constant-pressure chamber and the variable-pressure chamber. A plunger is slidably fitted into the valve body so as to move in association with an input shaft. A second passage extends through the plunger and the valve body so as to provide communication between the inside of the variable-pressure chamber and the outside of the valve body. The pneumatic booster further includes a valve member which is movable in association with the plunger such that at a first position, the valve member closes both the first and second passages, and at a second position, the valve member closes the first passage and opens the second passage, whereas at a third position, the valve member opens the first passage and closes the second passage. The valve member has a valve portion capable of resting on and separating from valve seat portions formed for the two passages, and a cylindrical portion. The valve and cylindrical portions are formed from a rigid integral reinforcing member and a seal member coated on a surface of the reinforcing member.

DETAILED DESCRIPTION

Prior to the description of the present invention, one example of conventional pneumatic boosters will be explained with reference to FIG. 4.

Figure 4:
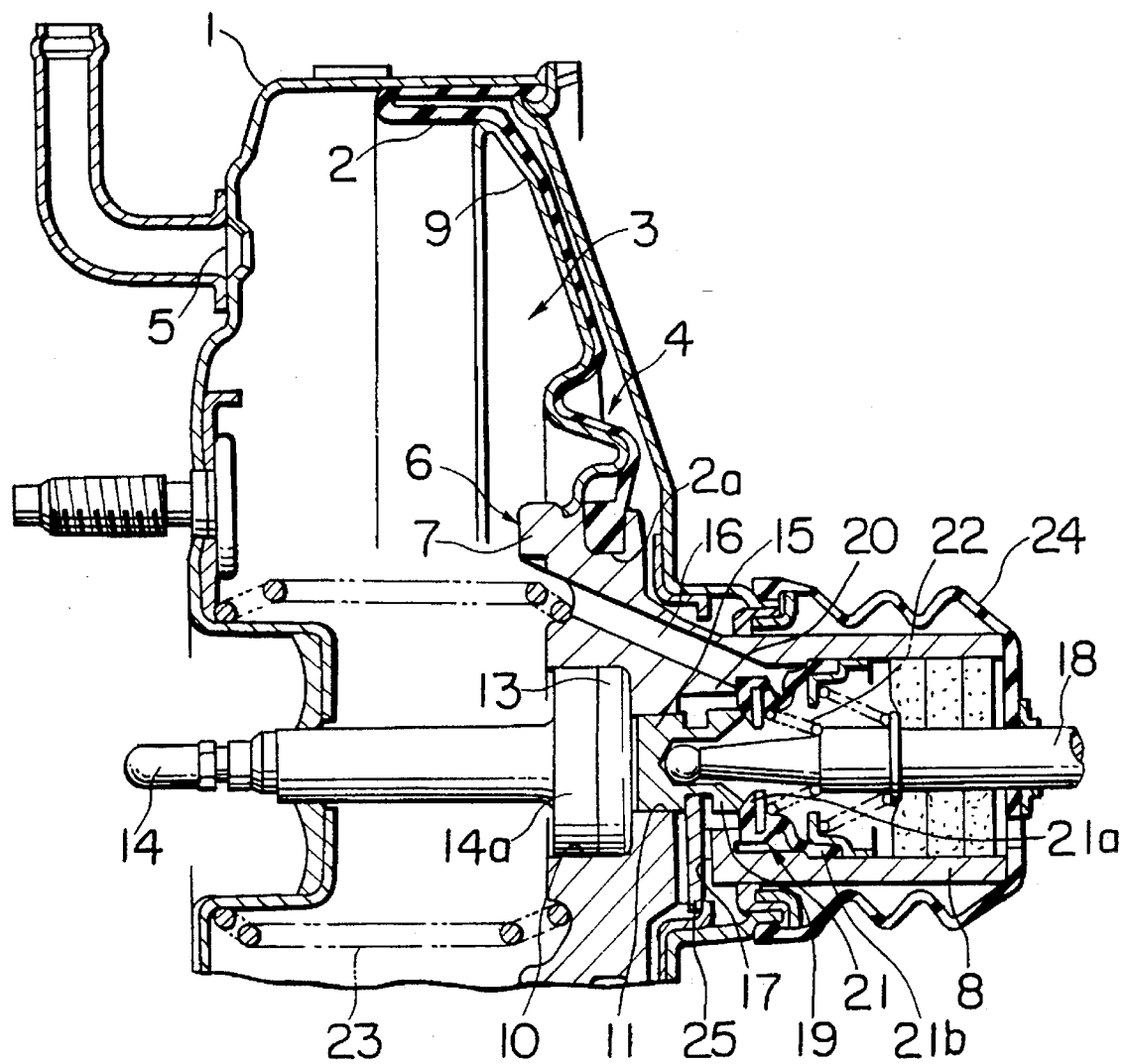
FIG. 4 is a sectional view showing a general structure of conventional pneumatic boosters.

A conventional pneumatic booster has a structure such as that shown, for example, in FIG. 4. Referring to the figure, a housing 1 has a diaphragm 2 disposed therein to divide the inside thereof into a constant-pressure chamber 3 and a variable-pressure chamber 4. The constant-pressure chamber 3 is supplied with a negative pressure from an engine through an inlet port 5. The center of the diaphragm 2 is provided with an opening 2a, in which a valve body 6 is disposed. The valve body 6 is composed of a body portion 7 and a hollow shaft portion 8 and is supported by the diaphragm 2 through a support plate 9 which is superimposed on the diaphragm 2 at the constant-pressure chamber side. It should be noted that the shaft portion 8 of the valve body 8 hermetically extends through the rear of the housing 1 as far as the outside thereof.

The body portion 7 of the valve body 6 is provided with a large-diameter bore 10 and a small-diameter bore 11, which are disposed in series. The large-diameter bore 10 accommodates a reaction disk 13 (described later) and a large-diameter proximal end portion 14a of an output shaft 14. The small-diameter bore 11 accommodates a plunger 15 (described later). The valve body 6 is further provided with a negative pressure passage 16 and an air passage 17, which are independent of each other, for providing communication between the variable-pressure chamber 4 and either the hollow inside of the shaft portion 8 or the constant-pressure chamber 3. The plunger 15 is slidably accommodated in the small-diameter bore 11, and the rear end portion of the plunger 15 is connected to one end of an input shaft 18 which moves in response to the actuation of a brake pedal (not shown). Seat portions 19 and 20 are respectively formed on the rear end of the plunger 15 and the inner surface of the shaft portion 8, including the opening edge of the negative pressure passage 16, so that a cylindrical valve member 21 which is disposed in the shaft portion 8 is capable of resting on and separating from the seat portions 19 and 20.

The valve member 21 is composed of a valve portion 21a, which is molded with a core material inserted therein, and an elastic seal portion 21b which is provided contiguously to the valve portion 21a. The proximal end portion of the seal portion 21b is secured to the inner surface of the shaft portion 8. On the other hand, the valve portion 21a of the valve member 21 is biased toward the extension side by a valve spring 22 which is engaged at one end thereof with the input shaft 18. Thus, the valve member 21 is normally positioned by the biasing force of the valve spring 22 in a state where the negative pressure passage 16 is closed with the valve portion 21a resting on the two seat portions 19 and 20. It should be noted that reference numeral 23 denotes a return spring for returning the valve body 6. A boot 24 covers a portion of the shaft portion 8 of the valve body 6 that projects from the housing 1. A stopper 25 limits the slidable range of the plunger 15.

In the above-described conventional pneumatic booster, when the brake pedal is stepped on in the inoperative state shown in FIG. 4, the input shaft 18 moves forward (leftward as viewed in the figure), causing the plunger 15 to slide. Consequently, the seat portion 19 of the plunger 15 separates from the valve member 21, thereby allowing the air to be introduced into the variable-pressure chamber 4 through the air passage 17. As a result, a pressure difference is produced between the constant-pressure chamber 3 supplied with the negative engine pressure and the variable-pressure chamber 4, supplied with the air, and thus a forward thrust is applied to the valve body 6. The thrust is transmitted to a master cylinder (not shown) through the rubber reaction disk 13 and the output shaft 14 to initiate a boosting action. At this time, the reaction disk 13 is moved to project into the small-diameter bore 11 by reaction, and the reaction to the movement of the reaction disk 13 is transmitted to the input shaft 18 through the plunger 15. On the other hand, when the brake pedal is released, the plunger 15 is moved backwardly by the force from the reaction disk 13, causing the valve member 21 to contract. As a result, the supply of the air into the variable-pressure chamber 4 is cut off, while the negative pressure passage 16 is opened to introduce the negative pressure in the constant-pressure chamber 3 into the variable-pressure chamber 4. Thus, the pressure difference between the two chambers 3 and 4 is canceled, and the thrust disappears.

According to the above-described conventional pneumatic booster, however, the valve member 21 has an elastic and easily deformable seal portion 21b. Therefore, when a large pressure difference is produced between the constant-pressure chamber 3 and the variable-pressure chamber 4, the valve member 21 may be deformed to produce a gap between it and the seat portions 19 and 20, causing leakage. The deformation of the valve member 21 is particularly large in a pneumatic booster of the type in which pressurized air is actively sent to the variable-pressure chamber 4 to amplify the differential pressure, thereby obtaining a large thrust. Therefore, in this type of pneumatic booster, the danger of leakage is intensified.

Embodiments of the present invention will be described below with reference to the accompanying drawings.

Figure 1:
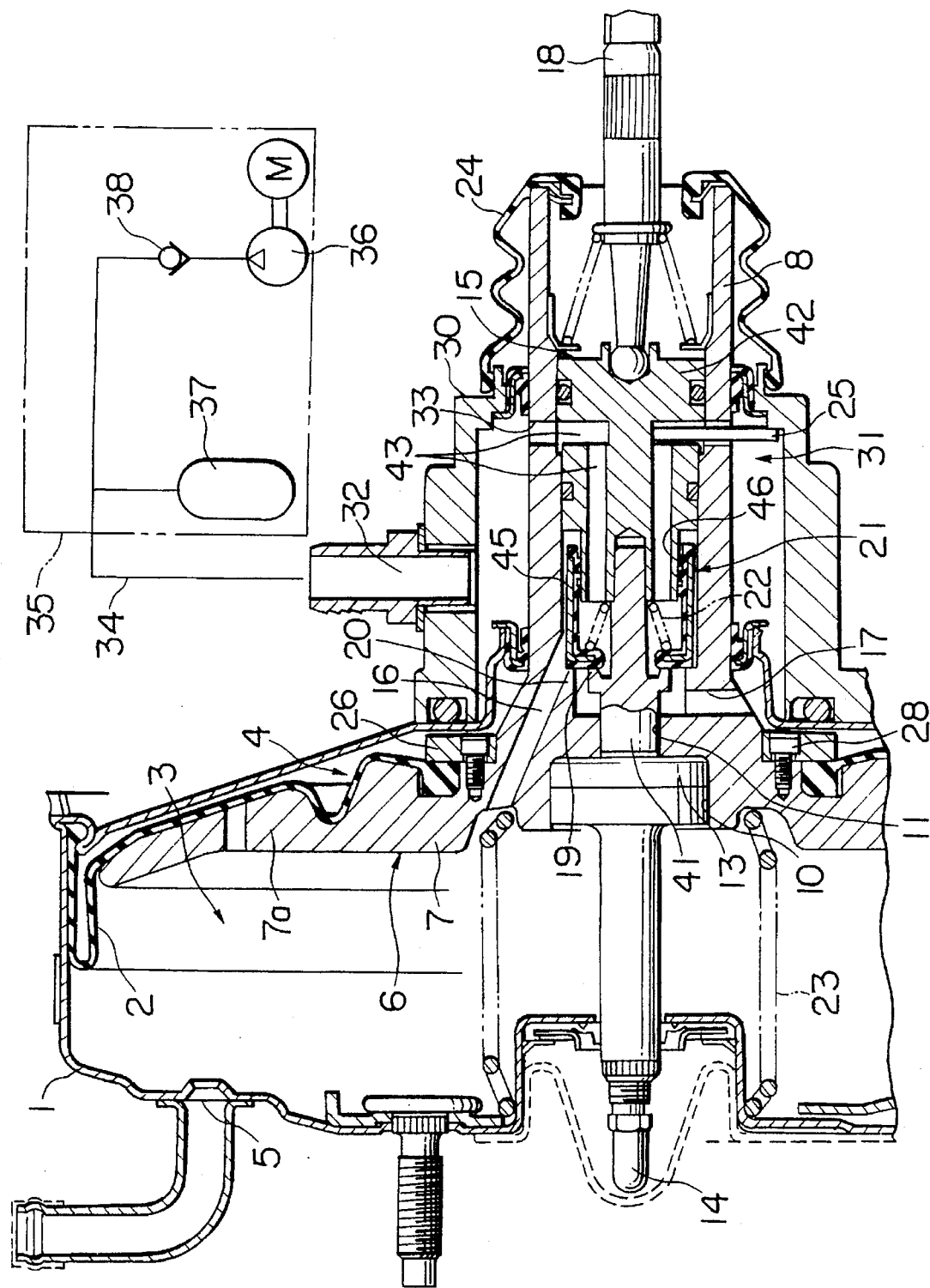
FIG. 1 is a sectional view showing the whole structure of a pneumatic booster according to one embodiment of the present invention.
Figure 2:
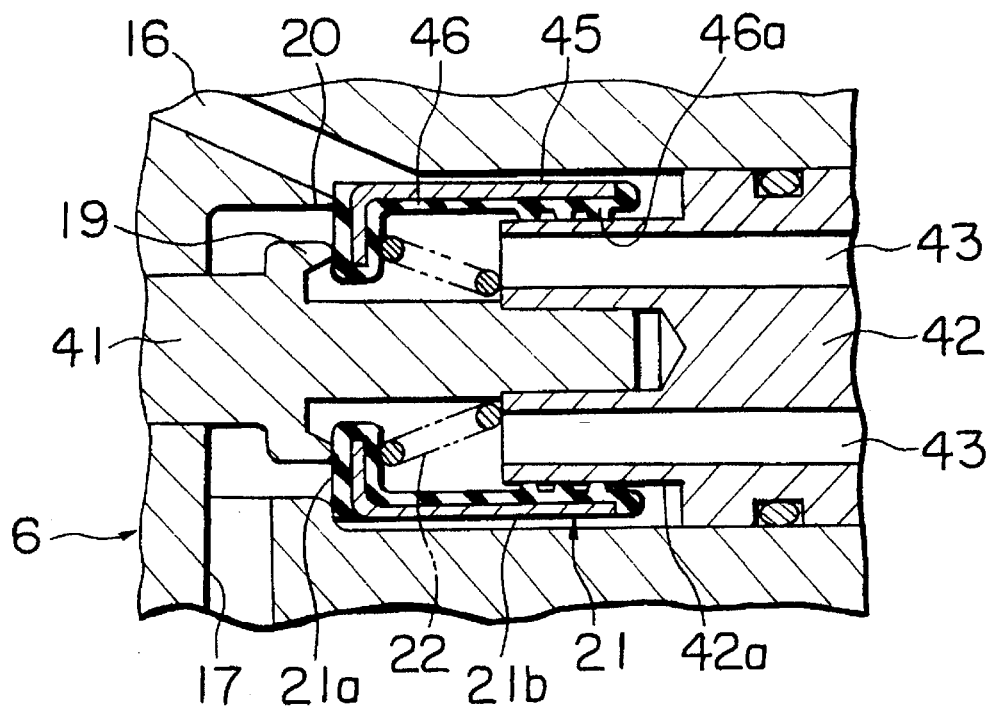
FIG. 2 is an enlarged sectional view showing an essential part of the pneumatic booster shown in FIG. 1.

FIGS. 1 and 2 show one embodiment of the pneumatic booster according to the present invention. It should be noted that this embodiment is intended for a booster of the type in which pressurized air is used, as described above. The basic structure of the embodiment is the same as that of the conventional pneumatic booster shown in FIG. 4. Therefore, the same portions and members as those shown in FIG. 4 are denoted by the same reference numerals, and description thereof is omitted. In this embodiment, the body portion 7 of the valve body 6 is integrally formed with a flange portion 7a having a relatively large diameter. The flange portion 7a is superimposed on the diaphragm 2 in place of the support plate 9 (see FIG. 4) and secured to the diaphragm 2 by using a retaining member 26 and bolts 28. The shaft portion 8 of the valve body 6 extends rearward to a considerable extent, and a portion thereof is covered with a casing 30 which is connected to the rear of the housing 1.

A hermetic air chamber 31 is defined between the casing 30 and the shaft portion 8. Intake ports 32 and 33 which are provided in the casing 30 and the shaft portion 8, respectively, open into the air chamber 31. It should be noted that there are a plurality of circumferentially spaced intake ports 33 in the shaft portion 8. A pneumatic device 35 is connected to the intake port 32 of the casing 30 through a pipe 34. The pneumatic device 35 includes a compressor 36, an accumulator 37, and a check valve 38 which is interposed therebetween, so that compressed air of predetermined pressure accumulated in the accumulator 37 is supplied to the air chamber 31 In the casing 30.

The plunger 15 is composed of a first sliding member 41 with a relatively small diameter which is slidably accommodated in the small-diameter bore 11 of the valve body 6, and a second sliding member 42 with a relatively large diameter which is slidably accommodated in the hollow shaft portion 8 of the valve body 6 and which is connected to the input shaft 18. The first and second sliding members 41 and 42 are integrated into one unit by press-fitting one end portion of the first sliding member 41 into an axial hole provided in the second sliding member 42. The outer periphery of the first sliding member 41 is formed with the seat portion 19 in the shape of an annular projection. A predetermined distance is maintained between the seat portion 19 and the forward end face of the second sliding member 42. The second sliding member 42 is formed with a plurality of pressurizing passages 43 which communicate with the intake ports 33 of the shaft portion 8 and also communicate with a space around the first sliding member 41. It should be noted that the stopper 25 for limiting the slidable range of the plunger 15 is inserted into one of the pressurizing passages 43 through one of the intake ports 33.

The second sliding member 42, which constitutes the plunger 15, has a small-diameter portion 42a (see FIG. 2) at the forward end thereof. The valve member 21 is slidably fitted on the small-diameter portion 42a. As is clearly shown in FIG. 2, the valve member 21 is formed from a metallic reinforcing member 45, and a rubber seal member 46 which is stuck to the reinforcing member 45 by vulcanization. Thus, the whole valve member 21, including the valve portion 21a and the seal portion 21b, forms a rigid structure. The seal member 46, which constitutes the valve member 21, covers the inner and outer surfaces of the reinforcing member 45 at the valve portion 21a and at the seal portion 21b. The seal member 46 is disposed on the side of the reinforcing member 45 at which sliding contact with the second sliding member 42 takes place. At the seal portion 21b, the seal member 46 is formed on the inner surface thereof, with a plurality of ridges 46a so that the valve member 21 is in sliding contact with the second sliding member 42 through the ridges 46a. The valve spring 22 is interposed between the end face of the second sliding member 42 and the bottom of the valve member 21. Thus, the valve member 21 is normally maintained in a state where the valve portion 21a rests on the two seat portions 20 and 19.

The operation of the pneumatic booster, arranged as described above, will be explained below.

In the inoperative state shown in FIG. 1, compressed air is supplied to the air chamber 31 in the casing 30 from the accumulator 37 of the pneumatic device 35. The compressed air is supplied to the inner side of the valve member 21 from the intake ports 33 provided in the shaft portion 8 of the valve body 6 through the pressurizing passages 43 provided in the second sliding member 42, which constitutes the plunger 15. When the brake pedal is stepped on in the inoperative state, the input shaft 18 moves forward (leftward as viewed in the figure). Consequently, the second sliding member 42 and the first sliding member 41, which constitute the plunger 15, slide as one unit, causing the seat portion 19 provided on the first sliding member 41 to separate from the valve portion 21a of the valve member 21, and thus allowing the compressed air to be introduced into the variable-pressure chamber 4 through the air passage 17. As a result, a large pressure difference is produced between the constant-pressure chamber 3 supplied with the engine negative pressure and the variable-pressure chamber 4 supplied with the compressed air, and thus a large forward thrust is applied to the valve body 6. The thrust is transmitted to the output shaft 14 through the rubber reaction disk 13 to initiate a boosting action.

On the other hand, when the brake pedal is released, the plunger 15 is moved backwardly by the force from the reaction disk 13, causing the valve member 21 to move backward. As a result, the supply of the compressed air into the variable-pressure chamber 4 is cut off, while the negative pressure passage 16 is opened to introduce the negative pressure in the constant-pressure chamber 3 into the variable-pressure chamber 4. Thus, the pressure difference between the two chambers 3 and 4 is canceled, and the thrust disappears. In this embodiment, the valve member 21 has a rigid structure which is formed by the reinforcing member 45 and hence sufficiently endures a large differential pressure produced between the constant-pressure chamber 3 and the variable-pressure chamber 4. Moreover, since the valve member 21 has the seal member 46 disposed on the side thereof where the valve member 21 rests on the seat portions 19 and 20, and also on the sliding surface thereof, satisfactory sealing properties can be ensured, and the valve performance can be stably maintained.

Although in the foregoing embodiment the present invention is applied to a booster of the type in which pressurized air is used, it should be noted that the present invention may also be applied to a general-purpose pneumatic booster such as that shown in FIG. 4, as a matter of course. In such a case, the outer peripheral surface of the seal portion 21b of the valve member 21 will be in sliding contact with the inner peripheral surface of the shaft portion 8 of the valve body 6. Therefore, the seal member 46 will be disposed on the outer side of the seal portion 21b.

Figure 2A:
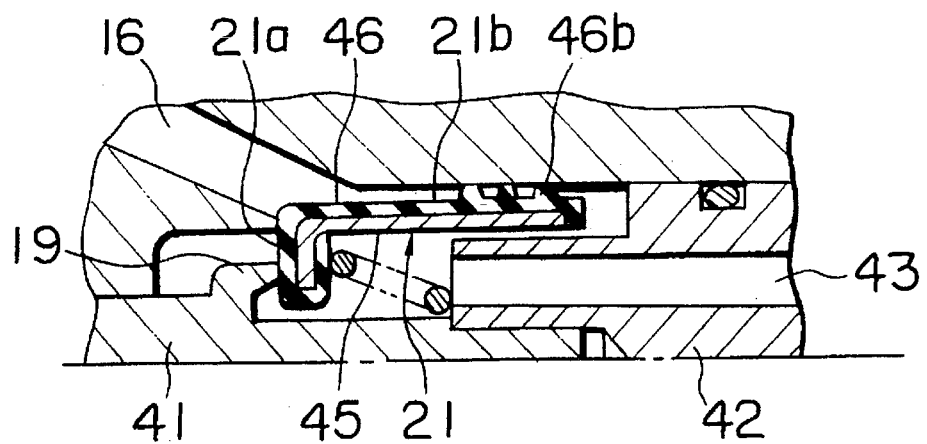
FIG. 2A is a view corresponding to FIG. 2 but showing a modified form of the arrangement of FIG. 2.

It is also possible to modify the embodiment shown in FIG. 2 so that the seal member 46 is disposed on the outer side of the seal portion 21b. The modified form is shown in FIG. 2A in which a plurality of ridges 46b sealingly contact the inner surface of the valve body.

Although in the foregoing embodiment a metallic material is used for the reinforcing member 45 and a rubber material for the seal member 46, any desired constituent materials may be used for these members. For example, it is possible to use a rigid plastic material for the reinforcing member 45 and a soft plastic material for the seal member 46.

Figure 3:
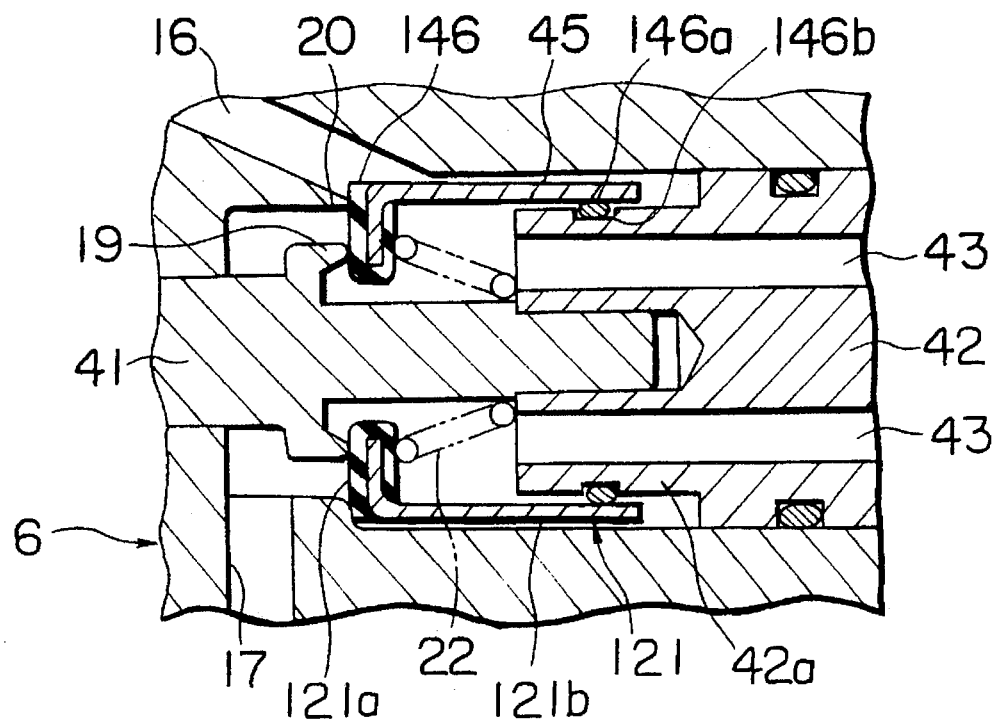
FIG. 3 is an enlarged sectional view, which corresponds to FIG. 2, showing an essential part of another embodiment of the present invention.

FIG. 3 is a sectional view showing an essential part of a second embodiment of the present invention. The same elements as those shown in FIG. 2 are denoted by the same reference numerals, and description thereof is omitted.

A valve member 121 in the second embodiment has a seal member 146 which is formed by coating a rubber material on both sides of a valve portion 121a only (i.e., only the flange portion of the reinforcing member 45). The small-diameter portion 42a of the second sliding member 42 is formed with an annular groove 146b, and an O-ring 146a is fitted in the groove 146b. Thus, a seal portion 121b (the cylindrical portion of the reinforcing member 45) slides on the small-diameter portion 42a with the area of sliding contact with the small-diameter portion 42a being sealed.

Figure 3A:
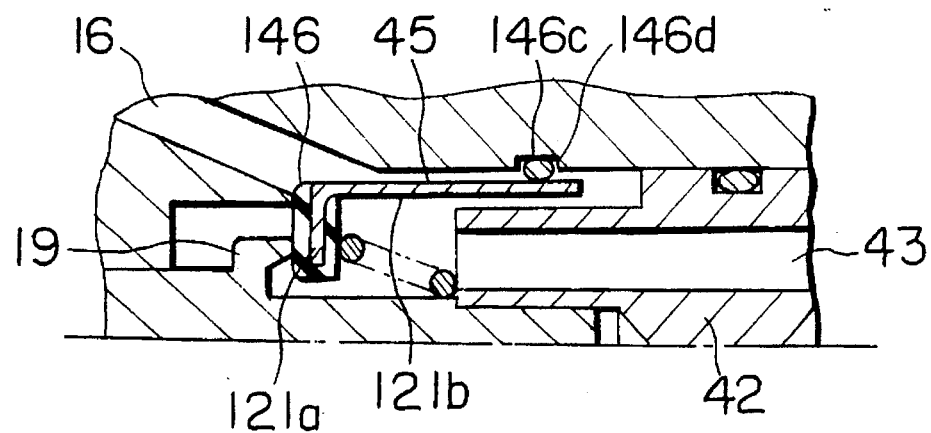
FIG. 3A is a view corresponding to FIG. 3 but showing a modified form of the arrangement of FIG. 3.

FIG. 3A shows a modified form of the arrangement of FIG. 3. In FIG. 3A, the inner peripheral surface of the shaft portion of the valve body has an annular groove 146d and an O-ring 146c is fitted in the groove 146d.

As has been detailed above, the pneumatic booster of the present Invention includes a valve member having a rigid structure which is reinforced with a rigid member. Therefore, the valve member is capable of sufficiently enduring a large differential pressure produced between the constant-pressure chamber and the variable-pressure chamber. Moreover, satisfactory sealing properties can be ensured by the seal member. Accordingly, the present invention greatly contributes to the improvement of the reliability and the enlargement of the applicable range of pneumatic boosters.

What is claimed is:

1. A pneumatic booster, comprising:

a housing defining a space therein;

a diaphragm dividing said space inside said housing into a constant-pressure chamber and a variable-pressure chamber;

a valve body hermetically attached to said diaphragm and having a first passage communicating said constant-pressure chamber with said variable-pressure chamber;

a plunger slidably fitted in said valve body so as to be movable in response to movement of an input shaft, said plunger comprising a first sliding member that is connectable to an output shaft, a second sliding member that is connected to said first sliding member at a junction and connectable to the input shaft and an axial direction;

a second passage having a portion that extends in said second sliding member of said plunger and a portion that extends in said valve body and around said first sliding member and communicates the inside of said variable-pressure chamber with the outside of said valve body; and valve means operative in response to movement of said plunger for opening said second passage while closing said first passage and for closing said second passage while opening said first passage, said valve means comprising a valve member that can open and close at least said second passage;

wherein said first sliding member comprises a valve seat in said second passage;

said valve member comprises a valve portion and a cylindrical portion, said cylindrical portion comprising a rigid integral reinforcing member;

said cylindrical portion of said valve member is fitted on a portion of said second sliding member of said plunger so as to cover said junction between said first sliding member and said second sliding member and so as to be movable in the axial direction of said plunger relative to said plunger and said valve body;

said valve portion of said valve member extends radially inwardly from one end of said cylindrical portion so that said valve portion can rest on and separate from said valve seat for selectively establishing and interrupting communication between said portion of said second passage in said second sliding member and said portion of said second passage that extends around said first sliding member; and wherein said valve member further comprises a seal member coated on said valve portion thereof at least at a surface portion of said valve portion engageable with said valve seat.

2. The pneumatic booster of claim 1, wherein a second valve seat is in said first passage and said valve portion of said valve member can rest on and separate from said second valve seat such that said valve member has a first position in which said valve portion closes both said first and second passages, a second position in which said valve portion closes said first passage and opens said second passage and a third position in which said valve portion opens said first passage and closes said second passage.

3. The pneumatic booster of claim 1, wherein said seal member is further coated on said cylindrical portion so as to face said second sliding member of said plunger.

4. A pneumatic booster, comprising:

a housing defining a space therein;

a diaphragm dividing said space inside said housing into a constant-pressure chamber and a variable-pressure chamber;

a valve body hermetically attached to said diaphragm and having a first passage communicating said constant-pressure chamber with said variable-pressure chamber;

an input shaft and an output shaft;

a plunger slidably fitted in said valve body so as to be movable in response to movement of said input shaft, said plunger comprising a first sliding member that is connected to said output shaft, a second sliding member that is connected to said first sliding member at a junction and connected to said input shaft, and an axial direction;

a second passage having a portion that extends in said second sliding member of said plunger and a portion that extends in said valve body and around said first sliding member and communicates the inside of said variable-pressure chamber with the outside of said valve body; and valve means operative in response to movement of said plunger for opening said second passage while closing said first passage and for closing said second passage while opening said first passage, said valve means comprising a valve member that can open and close at least said second passage;

wherein said first sliding member comprises a valve seat in said second passage;

said valve member comprises a valve portion and a cylindrical portion, said cylindrical portion comprising a rigid integral reinforcing member;

said cylindrical portion of said valve member is fitted on a portion of said second sliding member of said plunger so as to cover said junction between said first sliding member and said second sliding member and so as to be movable in the axial direction of said plunger relative to said plunger and said valve body;

said valve portion of said valve member extends radially inwardly from one end of said cylindrical portion so that said valve portion can rest on and separate from said valve seat for selectively establishing and interrupting communication between said portion of said second passage in said second sliding member and said portion of said second passage that extends around said first sliding member; and wherein said valve member further comprises a seal member coated on said valve portion thereof at least at a surface portion of said valve portion engageable with said valve seat.

5. The pneumatic booster of claim 4, wherein a second valve seat is in said first passage and said valve portion of said valve member can rest on and separate from said second valve seat such that said valve member has a first position in which said valve portion closes both said first and second passages, a second position in which said valve portion closes said first passage and opens said second passage and a third position in which said valve portion opens said first passage and closes said second passage.

6. The pneumatic booster of claim 4, wherein said seal member is further coated on said cylindrical portion so as to face said second sliding member of said plunger.

* * * * *